(12) United States Patent
Sasikumar et al.

(10) Patent No.: US 11,733,998 B2
(45) Date of Patent: Aug. 22, 2023

(54) METHOD AND APPARATUS FOR IMPLEMENTING AN APPLICATION RELEASE MANAGEMENT MODULE

(71) Applicant: JPMorgan Chase Bank, N.A., New York, NY (US)

(72) Inventors: Krishnan Sasikumar, Bengaluru (IN); Sai Ganesh Munduru, Eluru (IN); Bansal Jagdeep, Milton Keys (GB); Bret Goldsmith, Sugarland, TX (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 70 days.

(21) Appl. No.: 17/444,118

(22) Filed: Jul. 30, 2021

(65) Prior Publication Data

US 2022/0391200 A1    Dec. 8, 2022

(30) Foreign Application Priority Data

Jun. 5, 2021 (IN) .............................. 202111025069

(51) Int. Cl.
  *G06F 8/71* (2018.01)
  *G06F 8/60* (2018.01)
  *G06F 11/36* (2006.01)

(52) U.S. Cl.
  CPC ................. *G06F 8/71* (2013.01); *G06F 8/60* (2013.01); *G06F 11/3696* (2013.01)

(58) Field of Classification Search
  CPC .......... G06F 8/60; G06F 8/71; G06F 11/3696
  See application file for complete search history.

(56) References Cited

U.S. PATENT DOCUMENTS 6,536,037 B1 * 3/2003 Guheen ..................... G06F 8/71
                                                                   703/2
8,037,453 B1 * 10/2011 Zawadzki ................. G06F 8/71
                                                                   717/124

(Continued)

FOREIGN PATENT DOCUMENTS

| CN | 111930423 B | * | 8/2021 | ............... G06F 8/71 |
| CN | 114201408 A | * | 3/2022 | |
| EP | 3355185 A1 | * | 8/2018 | ............... G06F 8/41 |

OTHER PUBLICATIONS

Mikita et al. "The Deployment Pipeline", 2012, EDSIG www.aitp-edsig.org (Year: 2012).*

(Continued)

*Primary Examiner* — Wei Y Zhen
*Assistant Examiner* — Junchun Wu
(74) *Attorney, Agent, or Firm* — Greenblum & Bernstein, P.L.C.

(57) ABSTRACT

Various methods, apparatuses/systems, and media for implementing an application release management module are provided. A receiver receives a release branch and a fix version as input in connection with an application. A processor implements a hook with the release branch and the fix version as the input that automatically integrates project tracking systems as part of the deployment pipeline. The hook is configured to automatically trigger the following processes: receive the release branch as the input and connecting to a repository to fetch all project tracking system identifications (IDs) for a commit in connection with the application; connect to corresponding project tracking systems to fetch detail information data for those project tracking systems based the IDs fetched from the repository; and validate for status of the project tracking systems based on scanning and analyzing the fetched detail information (Continued)

data prior to approving the received request for the UAT deployment.

18 Claims, 5 Drawing Sheets

(56) References Cited

U.S. PATENT DOCUMENTS

| | | | | |
|---|---|---|---|---|
| 10,656,927 | B2* | 5/2020 | Hawrylo | G06F 8/71 |
| 2016/0330132 | A1* | 11/2016 | Rickey | G06Q 10/06 |
| 2017/0371636 | A1* | 12/2017 | Palavalli | G06F 9/5077 |
| 2019/0129712 | A1* | 5/2019 | Hawrylo | G06F 8/20 |
| 2019/0243640 | A1* | 8/2019 | Natari | G06F 8/60 |
| 2020/0004519 | A1* | 1/2020 | Ryall | G06F 8/71 |
| 2020/0133661 | A1* | 4/2020 | Alexander | G06F 11/3684 |
| 2021/0173718 | A1* | 6/2021 | Patel | G06F 40/295 |
| 2022/0019524 | A1* | 1/2022 | Ramachandran | G06F 11/3688 |
| 2022/0057999 | A1* | 2/2022 | Pitchai Muthu | G06F 8/30 |
| 2022/0103621 | A1* | 3/2022 | Lucas | G06F 16/9035 |
| 2022/0197621 | A1* | 6/2022 | Plewa | G06F 8/71 |
| 2022/0292012 | A1* | 9/2022 | Amin | G06F 11/3692 |
| 2022/0318754 | A1* | 10/2022 | Gleave | G06Q 10/06313 |

OTHER PUBLICATIONS

Humble et al. "Continuous Delivery", 2011, Pearson Education, Inc. (Year: 2011).*

Shafiq et al., "Effect of Project Management in Requirements Engineering and Requirements Change Management Processes for Global Software Development", Mar. 2018, IEEE (Year: 2018).*

Cleveland et al. "Orchestrating End-User Perspectives in the Software Release Process: An Integrated Release Management Framework", 2014, Hindawi Publishing Corporation (Year: 2014).*

Davis et al., "Toward Preprototype User Acceptance Testing of New Information Systems: Implications for Software Project Management", Feb. 2004, IEEE, vol. 15, No. 1 (Year: 2004).*

* cited by examiner

METHOD AND APPARATUS FOR IMPLEMENTING AN APPLICATION RELEASE MANAGEMENT MODULE

CROSS-REFERENCE TO RELATED APPLICATIONS

This application claims the benefit of priority from Indian Provisional Patent Application No. 202111025069, filed Jun. 5, 2021, which is herein incorporated by reference in its entirety.

TECHNICAL FIELD

This disclosure generally relates to software application release, and, more particularly, to methods and apparatuses for implementing an application release management module which integrates with a deployment pipeline to automatically validate a project tracking system status, fix version, ticket status, status of all dependent/child tickets etc. associated with an application before approving or rejecting the deployment pipeline request.

BACKGROUND

The developments described in this section are known to the inventors. However, unless otherwise indicated, it should not be assumed that any of the developments described in this section qualify as prior art merely by virtue of their inclusion in this section, or that those developments are known to a person of ordinary skill in the art.

As software application becomes increasingly more complex, development, test, release, and management of such software application also become more complex as a large number of unique combinations of paths and modules may be tested, released, and managed for each software application. Conventional tools exist for developing, testing and releasing application which generally require a significant amount of manual effort. Automation is an important aspect in any application development, test, and maintenance and at the same time it is also time consuming to write scripts and maintain those. For example, Jules may provide a CICD (continuous integration continuous delivery) pipeline for application development and testing. Jenkins also offers a free and open source automation server, which may help automate parts of software development related to developing, testing, and deploying, facilitating continuous integration and continuous delivery.

However, these conventional deployment pipelines do not validate readiness within items in a project tracking system and fails to provide automated additional check that may need to take place to increase the quality of the release. For example, today, at the moment for a release and deployment, a deployment pipeline, e.g., Jules or Jenkins, deploys the codes and takes the binary inputs from the UAT server.

In this conventional process, deployment cycle goes through a UAT cycle before deploying the software application, and therefore, there is always a possibility that unintended features can go into production, risk of leaving project tracking systems with incorrect status, disrupting UAT test cycles due to deployment of unapproved release branches (i.e., unstable UAT environment), requiring authorized member to scan and approve every change before allowing to deploy the build, etc., thereby reducing the quality of the release and significantly increasing release time.

SUMMARY

The present disclosure, through one or more of its various aspects, embodiments, and/or specific features or sub-components, may provide, among others, various systems, servers, devices, methods, media, programs, and platforms for implementing an application release management module which integrates with a deployment pipeline to automatically validate a project tracking system status, fix version, ticket status, status of all dependent/child tickets etc. associated with an application before approving or rejecting the deployment pipeline request, but the disclosure is not limited thereto. For example, the present disclosure, through one or more of its various aspects, embodiments, and/or specific features or sub-components, may further provide, among others, various systems, servers, devices, methods, media, programs, and platforms for implementing an application release management module which integrates with the deployment pipeline to automatically validate the project tracking system status, fix version, ticket status, status of all dependent/child tickets etc. associated with an application before approving or rejecting the deployment pipeline request, thereby eliminating risks of unapproved features being deployed in production, saving manual efforts involved in validating the project tracking systems, removing wait time due to automation, providing stable UAT environment, sending notification (i.e., email, text, etc.) to all users (i.e., stakeholders, development team, lead team, etc.) immediately on failures in deployment, etc., but the disclosure is not limited thereto.

According to an aspect of the present disclosure, a method for implementing an application release management module by utilizing one or more processors and one or more memories is disclosed. The method may include: receiving a request for a user acceptance testing (UAT) deployment in a deployment pipeline in connection with an application being developed and to be released; receiving a release branch and a fix version as input in connection with the application; implementing a hook with the release branch and the fix version as the input that automatically integrates project tracking systems as part of the deployment pipeline, wherein the hook is configured to automatically trigger the following processes: receiving the release branch as the input and connecting to a repository to fetch all project tracking system identifications (IDs) for a commit in connection with the application; connecting to corresponding project tracking systems to fetch detail information data for those project tracking systems based the IDs fetched from the repository; and validating for status of the project tracking systems based on scanning and analyzing the fetched detail information data prior to approving the received request for the UAT deployment.

According to another aspect of the present disclosure, the method may further include: receiving a positive validation result; and automatically approving the received request for the UAT deployment in the deployment pipeline.

According to yet another aspect of the present disclosure, the method may further include: receiving a negative validation result; automatically rejecting the received request for the UAT deployment in the deployment pipeline; and sending an electronic notification to a user device utilized by a development team member to address the negative validation result and fix the version.

According to further aspect of the present disclosure, the method may further include: receiving an input from the development team member via the user device after fixing the version; and automatically approving the received request for the UAT deployment in the deployment pipeline in response to receiving the input from the user device.

According to yet another aspect of the present disclosure, wherein the information data may include notes from a developer team member as to what codes need to be tested and what codes do not need to be tested before release of the application.

According to an additional aspect of the present disclosure, the method may further include: extracting a list of project tracking systems from the release branch.

According to yet another aspect of the present disclosure, wherein the hook may automatically integrate the project tracking systems as part of the deployment pipeline.

According to a further aspect of the present disclosure, wherein in validating, the method may further include: validating the fix version associated with the application; validating the commit, wherein the commit is an operation which sends latest changes to source code associated with the application to the repository; and validating dependent project tracking system status, child ticket status, and dependent ticket status associated with the application.

According to another aspect of the present disclosure, a system for implementing an application release management module is disclosed. The system may include a receiver configured to receive a request for a user acceptance testing (UAT) deployment in a deployment pipeline in connection with an application being developed and to be released; and a processor operatively connected to the receiver via a communication network. The processor may be configured to: receive a release branch and a fix version as input in connection with the application; implement a hook with the release branch and the fix version as the input that automatically integrates project tracking systems as part of the deployment pipeline, wherein the hook is configured to automatically trigger the following processes: receive the release branch as the input and connecting to a repository to fetch all project tracking system identifications (IDs) for a commit in connection with the application; connect to corresponding project tracking systems to fetch detail information data for those project tracking systems based the IDs fetched from the repository; and validate for status of the project tracking systems based on scanning and analyzing the fetched detail information data prior to approving the received request for the UAT deployment.

According to another aspect of the present disclosure, the processor may further configured to: receive a positive validation result; and automatically approve the received request for the UAT deployment in the deployment pipeline.

According to yet another aspect of the present disclosure, the processor may be further configured to: receive a negative validation result; automatically reject the received request for the UAT deployment in the deployment pipeline; and send an electronic notification to a user device utilized by a development team member to address the negative validation result and fix the version.

According to further aspect of the present disclosure, the processor may be further configured to: receive an input from the development team member via the user device after fixing the version; and automatically approve the received request for the UAT deployment in the deployment pipeline in response to receiving the input from the user device.

According to yet another aspect of the present disclosure, the processor may be further configured to extract a list of project tracking systems from the release branch.

According to an additional aspect of the present disclosure, the processor may be further configured to: validate the fix version associated with the application; validate the commit, wherein the commit is an operation which sends latest changes to source code associated with the application to the repository; and validate dependent project tracking system status, child ticket status, and dependent ticket status associated with the application.

According to another aspect of the present disclosure, a non-transitory computer readable medium configured to store instructions for implementing an application release management module is disclosed. The instructions, when executed, may cause a processor to perform the following: receiving a request for a user acceptance testing (UAT) deployment in a deployment pipeline in connection with an application being developed and to be released; receiving a release branch and a fix version as input in connection with the application; implementing a hook with the release branch and the fix version as the input that automatically integrates project tracking systems as part of the deployment pipeline, wherein the hook is configured to automatically trigger the following processes: receiving the release branch as the input and connecting to a repository to fetch all project tracking system identifications (IDs) for a commit in connection with the application; connecting to corresponding project tracking systems to fetch detail information data for those project tracking systems based the IDs fetched from the repository; and validating for status of the project tracking systems based on scanning and analyzing the fetched detail information data prior to approving the received request for the UAT deployment.

According to yet another aspect of the present disclosure, wherein, when executed, the instructions may further cause the processor to perform the following: receiving a positive validation result; and automatically approving the received request for the UAT deployment in the deployment pipeline.

According to further aspect of the present disclosure, wherein, when executed, the instructions may further cause the processor to perform the following: receiving a negative validation result; automatically rejecting the received request for the UAT deployment in the deployment pipeline; and sending an electronic notification to a user device utilized by a development team member to address the negative validation result and fix the version.

According to yet another aspect of the present disclosure, wherein, when executed, the instructions may further cause the processor to perform the following: receiving an input from the development team member via the user device after fixing the version; and automatically approving the received request for the UAT deployment in the deployment pipeline in response to receiving the input from the user device.

According to an additional aspect of the present disclosure, wherein, when executed, the instructions may further cause the processor to perform the following: extracting a list of project tracking systems from the release branch.

According to yet another aspect of the present disclosure, wherein in validating, the instructions, when executed, may further cause the processor to perform the following: validating the fix version associated with the application; validating the commit, wherein the commit is an operation which sends latest changes to source code associated with the application to the repository; and validating dependent project tracking system status, child ticket status, and dependent ticket status associated with the application.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Figure 1:
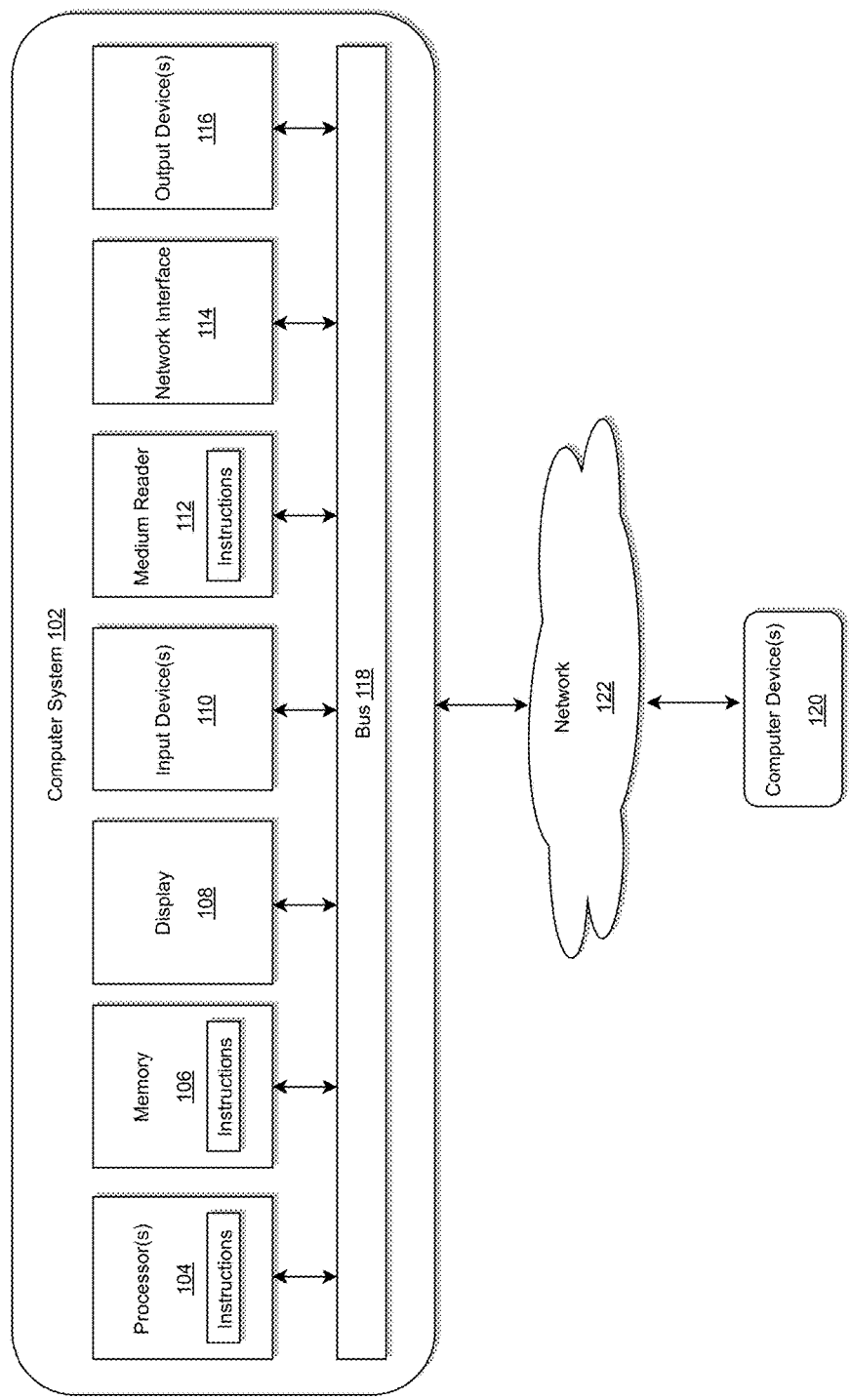
FIG. 1 illustrates a computer system for implementing an application release management device in accordance with an exemplary embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units, devices and/or modules. Those skilled in the art will appreciate that these blocks, units, devices, and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units, devices, and/or modules being implemented by microprocessors or similar, they may be programmed using software (e.g., microcode) to perform various functions discussed herein and may optionally be driven by firmware and/or software. Alternatively, each block, unit, device, and/or module may be implemented by dedicated hardware, or as a combination of dedicated hardware to perform some functions and a processor (e.g., one or more programmed microprocessors and associated circuitry) to perform other functions. Also, each block, unit, device, and/or module of the example embodiments may be physically separated into two or more interacting and discrete blocks, units, devices, and/or modules without departing from the scope of the inventive concepts. Further, the blocks, units, devices, and/or modules of the example embodiments may be physically combined into more complex blocks, units, devices, and/or modules without departing from the scope of the present disclosure.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionality as described herein, and a processor described herein may be used to support a virtual processing environment.

As described herein, various embodiments provide optimized processes of implementing an application release management module which integrates with the deployment pipeline to automatically validate the project tracking system status, fix version, ticket status, status of all dependent/child tickets etc. associated with an application before approving or rejecting the deployment pipeline request, but the disclosure is not limited thereto. As described herein, various embodiments may further provide optimized processes of implementing an application release management module which integrates with the deployment pipeline to automatically validate the project tracking system status, fix version, ticket status, status of all dependent/child tickets etc. associated with an application before approving or rejecting the deployment pipeline request, thereby eliminating risks of unapproved features being deployed in production, saving manual efforts involved in validating the project tracking systems, removing wait time due to automation, providing stable UAT environment, sending notification (i.e., email, text, etc.) to all users (i.e., stakeholders, development team, lead team, etc.) immediately on failures in deployment, etc., but the disclosure is not limited thereto.

Figure 2:
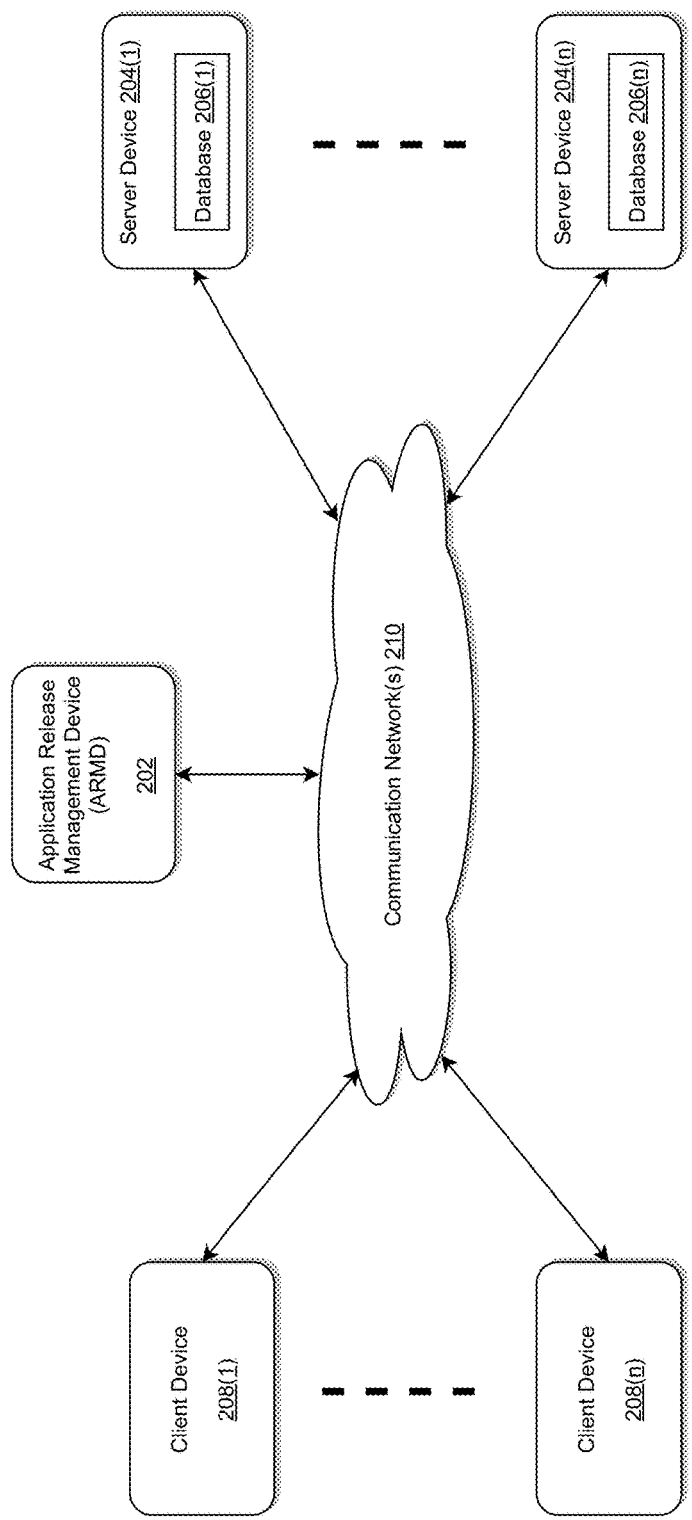
FIG. 2 illustrates an exemplary diagram of a network environment with an application release management device in accordance with an exemplary embodiment.

Referring to FIG. 2, a schematic of an exemplary network environment 200 for implementing an application release management device (ARMD) of the instant disclosure is illustrated.

Conventional system, that does not implement an ARMD of the instant disclosure, may not be able to validate readiness within items in a project tracking system and may fail to provide automated additional check that may need to take place to increase the quality of the release.

According to exemplary embodiments, the above-described problems associated with conventional system may be overcome by implementing an ARMD 202 having an application release management module which integrates with the deployment pipeline to automatically validate the project tracking system status, fix version, ticket status, status of all dependent/child tickets etc. associated with an application before approving or rejecting the deployment pipeline request, but the disclosure is not limited thereto. For example, the present disclosure, through one or more of its various aspects, embodiments, and/or specific features or sub-components, may further provide, among others, various systems, servers, devices, methods, media, programs, and platforms for implementing an application release management module embedded within the ARMD 202 which integrates with the deployment pipeline to automatically validate the project tracking system status, fix version, ticket status, status of all dependent/child tickets etc. associated with an application before approving or rejecting the deployment pipeline request, thereby eliminating risks of unapproved features being deployed in production, saving manual efforts involved in validating the project tracking systems, removing wait time due to automation, providing stable UAT environment, sending notification (i.e., email, text, etc.) to all users (i.e., stakeholders, development team, lead team, etc.) immediately on failures in deployment, etc., but the disclosure is not limited thereto.

The ARMD 202 may be the same or similar to the computer system 102 as described with respect to FIG. 1.

The ARMD 202 may store one or more applications that can include executable instructions that, when executed by the ARMD 202, cause the ARMD 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the ARMD 202 itself, may be located in virtual server(s) running in a cloud-based computing environment rather than being tied to one or more specific physical network computing devices. Also, the application(s) may be running in one or more virtual machines (VMs) executing on the ARMD 202. Additionally, in one or more embodiments of this technology, virtual machine(s) running on the ARMD 202 may be managed or supervised by a hypervisor.

In the network environment 200 of FIG. 2, the ARMD 202 is coupled to a plurality of server devices 204(1)-204(n) that hosts a plurality of databases 206(1)-206(n), and also to a plurality of client devices 208(1)-208(n) via communication network(s) 210. A communication interface of the ARMD 202, such as the network interface 114 of the computer system 102 of FIG. 1, operatively couples and communicates between the ARMD 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the ARMD 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 202 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The ARMD 202 may be a standalone device or integrated with one or more other devices or apparatuses, such as one or more of the server devices 204(1)-204(n), for example. In one particular example, the ARMD 202 may be hosted by one of the server devices 204(1)-204(n), and other arrangements are also possible. Moreover, one or more of the devices of the ARMD 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the ARMD 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include any type of computing device that can facilitate the implementation of the ARMD 202 that may be configured for automatically integrating with a deployment pipeline to validate a project tracking system status, fix version, dependent ticket status, and child ticket status, associated with an application before approving or rejecting the deployment pipeline request, but the disclosure is not limited thereto.

Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example.

The client devices 208(1)-208(n) may run interface applications, such as standard web browsers or standalone client applications, which may provide an interface to communicate with the ARMD 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the ARMD 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the ARMD 202, the server devices 204(1)-204(n), or the client devices 208(1)-208(n), for example, may be configured to operate as virtual instances on the same physical machine. For example, one or more of the ARMD 202, the server devices 204(1)-204(n), or the client devices 208(1)-208(n) may operate on the same physical device rather than as separate devices communicating through communication network(s) 210. Additionally, there may be more or fewer ARMDs 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
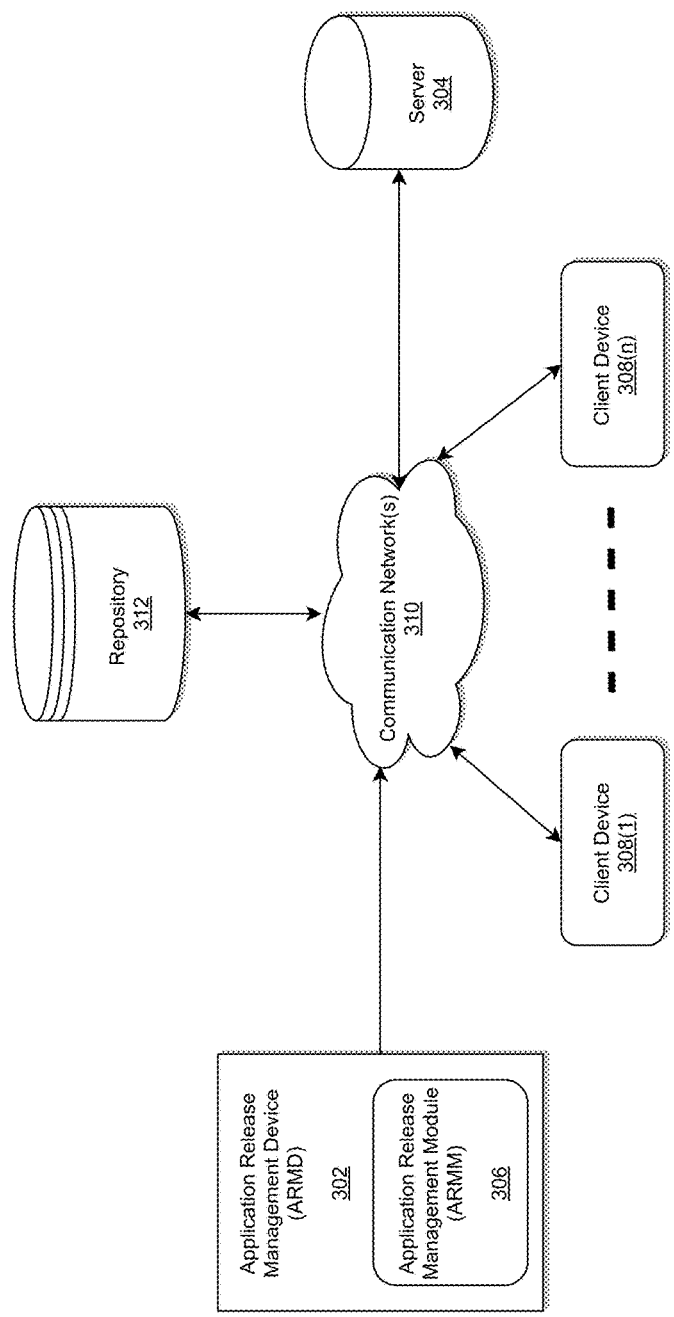
FIG. 3 illustrates a system diagram for implementing an application release management device with an application release management module in accordance with an exemplary embodiment.

FIG. 3 illustrates a system diagram for implementing an ARMD with an application release management module (ARMM) in accordance with an exemplary embodiment.

As illustrated in FIG. 3, according to exemplary embodiments, the system 300 may include an ARMD 302 including an ARMM 306 that may be connected to a server 304 and a repository 312 (i.e., Bit Bucket, but the disclosure is not limited thereto) via a communication network 310, but the disclosure is not limited thereto. For example, according to exemplary embodiments, the ARMM 306 may be connected to any desired repository besides the repository 312. The ARMD 302 may also be connected to a first client device 308(1) and a second client device 308(2) via the communication network 310, but the disclosure is not limited thereto.

According to exemplary embodiment, the ARMD 302 is described and shown in FIG. 3 as including the ARMM 306, although it may include other rules, policies, modules, repositories, or applications, for example. According to exemplary embodiments, the repository 312 may be embedded within the ARMD 302. According to exemplary embodiments, the server 404 and/or the repository 412 may be configured to store information including release branch fix version, project tracking system identifications (IDs) for a commit in connection with an application etc., but the disclosure is not limited thereto.

According to exemplary embodiments, the ARMM 306 may be configured to receive continuous feed of data from the server 304 and the repository 312 via the communication network 310.

As will be described below, the ARMM 306 may be configured to receive a request for a user acceptance testing (UAT) deployment in a deployment pipeline in connection with an application being developed and to be released; receive a release branch and a fix version as input in connection with the application; implement a hook with the release branch and the fix version as the input that automatically integrates project tracking systems as part of the deployment pipeline, wherein the hook is configured to automatically trigger the following processes: receive the release branch as the input and connect to the repository 312 to fetch all project tracking system identifications (IDs) for a commit in connection with the application; connect to corresponding project tracking systems to fetch detail information data for those project tracking systems based the IDs fetched from the repository; and validate for status of the project tracking systems based on scanning and analyzing the fetched detail information data prior to approving the received request for the UAT deployment.

The first client device 308(1) and the second client device 308(2) are illustrated as being in communication with the ARMD 302. In this regard, the first client device 308(1) and the second client device 308(2) may be "clients" of the ARMD 302 and are described herein as such. Nevertheless, it is to be known and understood that the first client device 308(1) and/or the second client device 308(2) need not necessarily be "clients" of the ARMD 302, or any entity described in association therewith herein. Any additional or alternative relationship may exist between either or both of the first client device 308(1) and the second client device 308(2) and the ARMD 302, or no relationship may exist.

The first client device 308(1) may be, for example, a smart phone. Of course, the first client device 308(1) may be any additional device described herein. The second client device 308(2) may be, for example, a personal computer (PC). Of course, the second client device 308(2) may also be any additional device described herein. According to exemplary embodiments, the server 304 may be the same or equivalent to the server device 204 as illustrated in FIG. 2.

The process may be executed via the communication network 310, which may comprise plural networks as described above. For example, in an exemplary embodiment, either or both of the first client device 308(1) and the second client device 308(2) may communicate with the ARMD 302 via broadband or cellular communication. Of course, these embodiments are merely exemplary and are not limiting or exhaustive.

Figure 4:
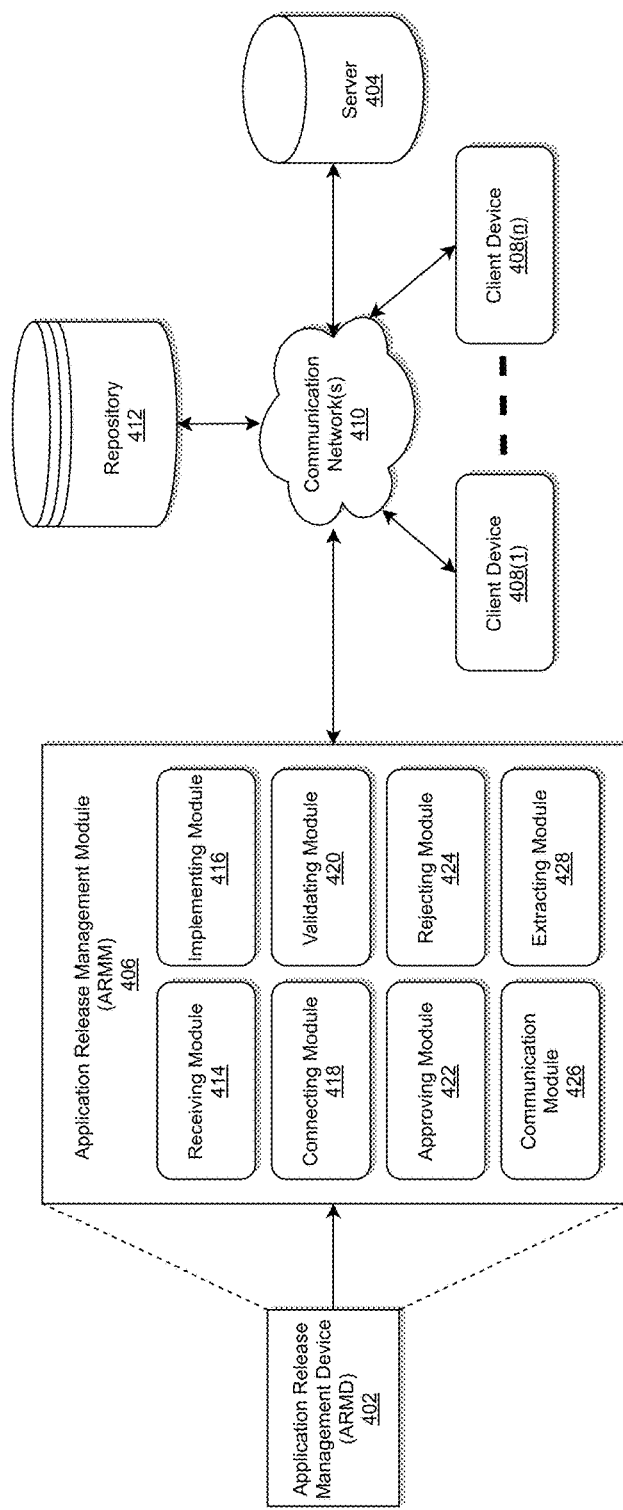
FIG. 4 illustrates a system diagram for implementing an application release management module of FIG. 3 in accordance with an exemplary embodiment.

FIG. 4 illustrates a system diagram for implementing an ARMM of FIG. 3 in accordance with an exemplary embodiment. As illustrated in FIG. 4, the system 400 may include an ARMD 402 within which an ARMM 406 may be embedded, a repository 412, a server 404, and a communication network 410.

According to exemplary embodiments, the ARMD 402 including the ARMM 406 may be connected to the server 404, and the repository 412 via the communication network 410. The ARMD 402 may also be connected to the plurality of client devices 408(1) . . . 408(n) via the communication network 410, but the disclosure is not limited thereto. According to exemplary embodiments, the ARMD 402, the ARMM 406, the repository 412, the server 404, the client devices 408(1)-408(n), and the communication network 410 as illustrated in FIG. 4 may be the same or similar to the ARMD 302, the ARMM 306, the repository 312, the server 304, the client devices 308(1)-308(n), and the communication network 310, respectively, as illustrated in FIG. 3.

According to exemplary embodiment, the ARMD 402 is described and shown in FIG. 4 as including the ARMM 406, although it may include other rules, policies, modules, repositories, or applications, for example. According to exemplary embodiments, the repository 412 may be embedded within the ARMD 302. According to exemplary embodiments, the server 404 and/or the repository 412 may be configured to store information including release branch fix version, project tracking system identifications (IDs) for a commit in connection with an application etc., but the disclosure is not limited thereto.

As illustrated in FIG. 4, the ARMM 406 may include a receiving module 414, an implementing module 416, a connecting module 418, a validating module 420, an approving module 422, a rejecting module 424, a communication module 426, and an extracting module 428. According to exemplary embodiments, the repository 412 may be external to the ARMD 402 and the ARMD 402 may include various systems that are managed and operated by an organization.

The process may be executed via the communication network 410, which may comprise plural networks as described above. For example, in an exemplary embodiment, the various components of the ARMM 406 may communicate with the server 404, and the repository 412 via the communication module 426 and the communication network 410. Of course, these embodiments are merely exemplary and are not limiting or exhaustive.

According to exemplary embodiments, the communication module 426 may be configured to establish a link between the repository 412 and the ARMM 406 via the communication network 410.

According to exemplary embodiments, each of the receiving module 414, implementing module 416, connecting module 418, validating module 420, approving module 422, rejecting module 424, communication module 426, and the extracting module 428 may be implemented by microprocessors or similar, they may be programmed using software (e.g., microcode) to perform various functions discussed herein and may optionally be driven by firmware and/or software. Alternatively, each of the receiving module 414, implementing module 416, connecting module 418, validating module 420, approving module 422, rejecting module 424, communication module 426, and the extracting module 428 may be implemented by dedicated hardware, or as a combination of dedicated hardware to perform some functions and a processor (e.g., one or more programmed microprocessors and associated circuitry) to perform other functions. Also, according to exemplary embodiments, each of the receiving module 414, implementing module 416, connecting module 418, validating module 420, approving module 422, rejecting module 424, communication module 426, and the extracting module 428 may be physically separated into two or more interacting and discrete blocks, units, devices, and/or modules without departing from the scope of the inventive concepts.

According to exemplary embodiments, the receiving module 414, implementing module 416, connecting module 418, validating module 420, approving module 422, rejecting module 424, communication module 426, and the extracting module 428 of the ARMM 406 may be called via corresponding API.

According to exemplary embodiments, the receiving module 414 may be configured to receive a request for a user acceptance testing (UAT) deployment in a deployment pipeline in connection with an application being developed and to be released. The receiving module 414 may further be configured to receive a release branch and a fix version as input in connection with the application.

According to exemplary embodiments, the implementing module 416 may be configured to implement a hook with the release branch and the fix version as the input that automatically integrates project tracking systems as part of the deployment pipeline.

According to exemplary embodiments, the hook may be configured to automatically trigger the following processes: receiving the release branch as the input by utilizing the receiving module 414 and connecting to the repository 412 (i.e., a Bit Bucket, but the disclosure is not limited thereto), by utilizing the communication module 426, to fetch all project tracking system identifications (IDs) for a commit in connection with the application.

According to exemplary embodiments, the hook may be configured to automatically trigger the following processes: connecting to corresponding project tracking systems to fetch detail information data for those project tracking systems based the IDs fetched from the repository 412 by utilizing the communication module 426; and validating for status of the project tracking systems based on scanning and analyzing the fetched detail information data prior to approving the received request for the UAT deployment by utilizing the validating module 420.

According to exemplary embodiments, the receiving module 414 may be further configured to receive a positive validation result; and the approving module 422 may be further configured to automatically approve the received request for the UAT deployment in the deployment pipeline.

According to exemplary embodiments, the receiving module 414 may be further configured to receive a negative validation result. The rejecting module 424 may be configured to automatically reject the received request for the UAT deployment in the deployment pipeline; and the communication module 426 may be configured to send an electronic notification to a user device (i.e., one of the client device 408(1)-408(n)) utilized by a development team member to address the negative validation result and fix the version.

According to exemplary embodiments, the receiving module 414 may be further configured to receive an input from the development team member via the user device (i.e., one of the client device 408(1)-408(n)) after fixing the version. The approving module 422 may be configured to automatically approve the received request for the UAT deployment in the deployment pipeline in response to receiving the input from the user device.

According to exemplary embodiments, the information data may include notes from a developer team member as to what codes need to be tested and what codes do not need to be tested before release of the application.

According to exemplary embodiments, the extracting module 428 may be configured to extract a list of project tracking systems from the release branch.

According to exemplary embodiments, the hook may automatically integrate the project tracking systems as part of the deployment pipeline.

According to exemplary embodiments, wherein in validating, the validating module 420 may be further configured to validate the fix version associated with the application; validate the commit, wherein the commit may be an operation which sends latest changes to source code associated with the application to the repository; and validate dependent project tracking system status, child ticket status, and dependent ticket status associated with the application.

Figure 5:
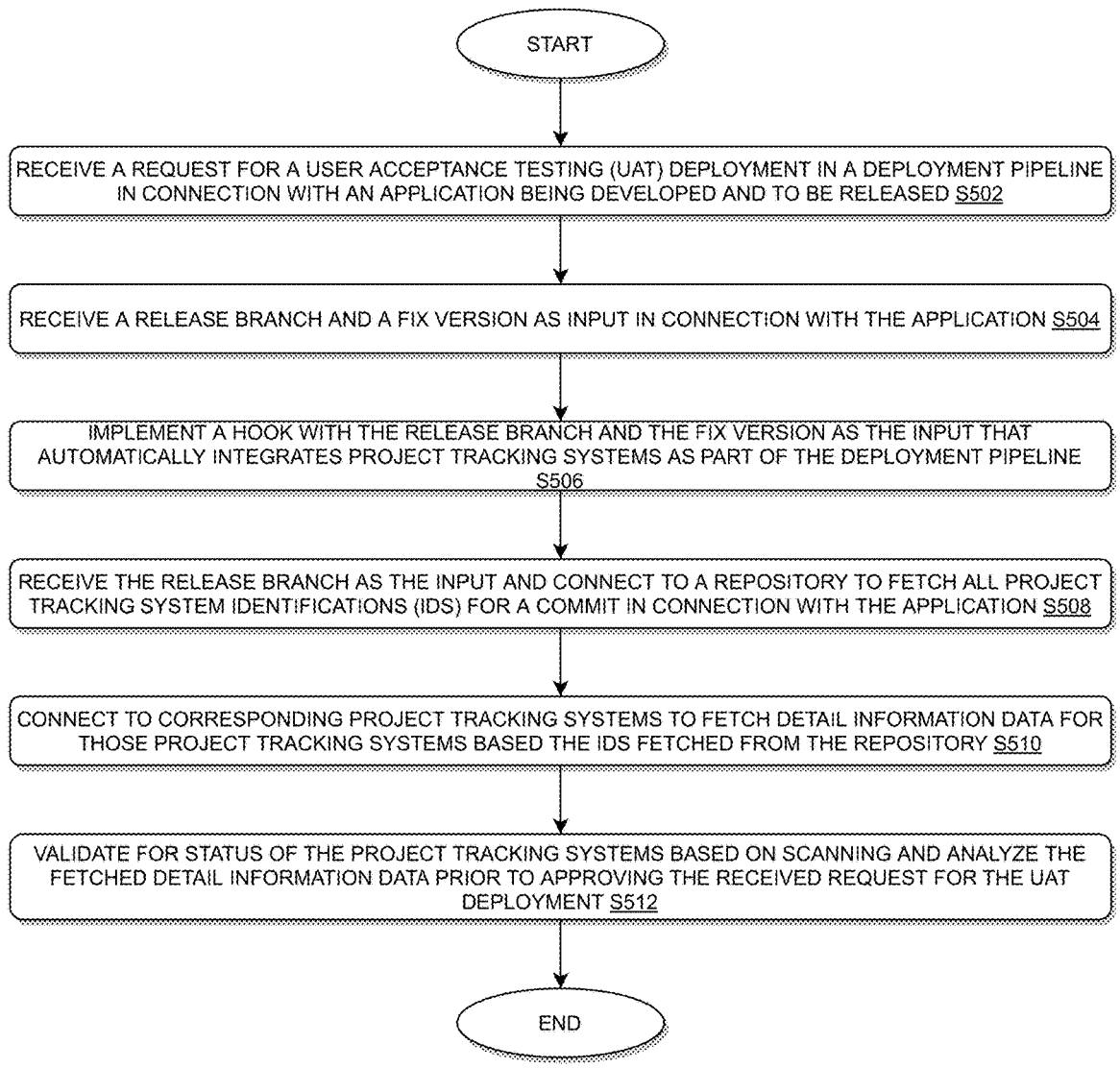
FIG. 5 illustrates a flow chart for implementing an application release management module in accordance with an exemplary embodiment.

FIG. 5 illustrates a flow chart for implementing an application release management module in accordance with an exemplary embodiment.

It will be appreciated that the illustrated process 500 and associated steps may be performed in a different order, with illustrated steps omitted, with additional steps added, or with a combination of reordered, combined, omitted, or additional steps.

In the process 500 of FIG. 5, at step S502, a request may be received for a user acceptance testing (UAT) deployment in a deployment pipeline in connection with an application being developed and to be released.

At step S504, a release branch and a fix version may be received as input in connection with the application.

At step S506, a hook may be implemented with the release branch and the fix version as the input that automatically integrates project tracking systems as part of the deployment pipeline.

At step S508, the release branch may be received as the input and connect to a repository to fetch all project tracking system identifications (IDs) for a commit in connection with the application.

At step S510, the process 500 may connect to corresponding project tracking systems to fetch detail information data for those project tracking systems based the IDs fetched from the repository.

At step S512, the process 500 may validate for status of the project tracking systems based on scanning and analyzing the fetched detail information data prior to approving the received request for the UAT deployment.

According to exemplary embodiments, the process 500 may further include: receiving a positive validation result; and automatically approving the received request for the UAT deployment in the deployment pipeline.

According to exemplary embodiments, the process 500 may further include: receiving a negative validation result; automatically rejecting the received request for the UAT deployment in the deployment pipeline; and sending an electronic notification to a user device utilized by a development team member to address the negative validation result and fix the version.

According to exemplary embodiments, the process 500 may further include: receiving an input from the development team member via the user device after fixing the version; and automatically approving the received request for the UAT deployment in the deployment pipeline in response to receiving the input from the user device.

According to exemplary embodiments, the process 500 may further include: extracting a list of project tracking systems from the release branch.

According to exemplary embodiments, in validating, the process 500 may further include: validating the fix version associated with the application; validating the commit, wherein the commit may be an operation which sends latest changes to source code associated with the application to the repository; and validating dependent project tracking system status, child ticket status, and dependent ticket status associated with the application.

According to exemplary embodiments, a non-transitory computer readable medium may be configured to store instructions for implementing the ARMM 406 for automatically integrating with a deployment pipeline to integrate with a project tracking system as part of the deployment pipeline to validate the project tracking system status, and fix version of the application before approving or rejecting the pipeline request. According to exemplary embodiments, the instructions, when executed, may cause a processor embedded within the ARMM 406 or the ARMD 402 to perform the following: receiving a request for a user acceptance testing (UAT) deployment in a deployment pipeline in connection with an application being developed and to be released; receiving a release branch and a fix version as input in connection with the application; implementing a hook with the release branch and the fix version as the input that automatically integrates project tracking systems as part of the deployment pipeline, wherein the hook is configured to automatically trigger the following processes: receiving the release branch as the input and connecting to a repository to fetch all project tracking system identifications (IDs) for a commit in connection with the application; connecting to corresponding project tracking systems to fetch detail information data for those project tracking systems based the IDs fetched from the repository; and validating for status of the project tracking systems based on scanning and analyzing the fetched detail information data prior to approving the received request for the UAT deployment. The processor may be the same or similar to the processor 104 as illustrated in FIG. 1 or the processor embedded within ARMD 202, ARMD 302, ARMD 402, and ARMM 406.

According to exemplary embodiments, the instructions, when executed, may cause the processor 104 to perform the following: receiving a positive validation result; and automatically approving the received request for the UAT deployment in the deployment pipeline.

According to exemplary embodiments, the instructions, when executed, may cause the processor 104 to perform the following: receiving a negative validation result; automatically rejecting the received request for the UAT deployment in the deployment pipeline; and sending an electronic notification to a user device utilized by a development team member to address the negative validation result and fix the version.

According to exemplary embodiments, the instructions, when executed, may cause the processor 104 to perform the following: receiving an input from the development team member via the user device after fixing the version; and automatically approving the received request for the UAT deployment in the deployment pipeline in response to receiving the input from the user device.

According to exemplary embodiments, the instructions, when executed, may cause the processor 104 to perform the following: extracting a list of project tracking systems from the release branch.

According to exemplary embodiments, in validating, the instructions, when executed, may cause the processor 104 to perform the following: validating the fix version associated with the application; validating the commit, wherein the commit may be an operation which sends latest changes to source code associated with the application to the repository; and validating dependent project tracking system status, child ticket status, and dependent ticket status associated with the application.

According to exemplary embodiments as disclosed above in FIGS. 1-5, technical improvements effected by the instant disclosure may include platforms for implementing an application release management module which integrates with the deployment pipeline to automatically validate the project tracking system status, fix version, ticket status, status of all dependent/child tickets etc. associated with an application before approving or rejecting the deployment pipeline request, but the disclosure is not limited thereto. In addition, according to exemplary embodiments as disclosed above in FIGS. 1-5, technical improvements effected by the instant disclosure may include platforms for implementing an application release management module which integrates with the deployment pipeline to automatically validate the project tracking system status, fix version, ticket status, status of all dependent/child tickets etc. associated with an application before approving or rejecting the deployment pipeline request, thereby eliminating risks of unapproved features being deployed in production, saving manual efforts involved in validating the project tracking systems, removing wait time due to automation, providing stable UAT environment, sending notification (i.e., email, text, etc.) to all users (i.e., stakeholders, development team, lead team, etc.) immediately on failures in deployment, etc., but the disclosure is not limited thereto.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed repository, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for implementing an application release management module by utilizing one or more processors and one or more memories, the method comprising:
   receiving a request for a user acceptance testing (UAT) deployment in a deployment pipeline in connection with an application being developed and to be released;
   receiving a release branch and a fix version as input in connection with the application;
   implementing a hook with the release branch and the fix version as the input that automatically integrates project tracking systems as part of the deployment pipeline, wherein the hook is configured to automatically trigger the following processes:
   receiving the release branch as the input and connecting to a repository to fetch all project tracking system identifications (IDs) for a commit in connection with the application;
   connecting to corresponding project tracking systems to fetch detail information data for those project tracking systems based the IDs fetched from the repository; and
   validating for status of the project tracking systems based on scanning and analyzing the fetched detail information data prior to approving the received request for the UAT deployment, wherein validating further comprising:
   validating the fix version associated with the application;
   validating the commit, wherein the commit is an operation which sends latest changes to source code associated with the application to the repository; and
   validating dependent project tracking system status, child ticket status, and dependent ticket status associated with the application.

2. The method according to claim 1, further comprising:
   receiving a positive validation result; and
   automatically approving the received request for the UAT deployment in the deployment pipeline.

3. The method according to claim 1, further comprising:
   receiving a negative validation result;
   automatically rejecting the received request for the UAT deployment in the deployment pipeline; and
   sending an electronic notification to a user device utilized by a development team member to address the negative validation result and fix the version.

4. The method according to claim 3, further comprising:
   receiving an input from the development team member via the user device after fixing the version; and
   automatically approving the received request for the UAT deployment in the deployment pipeline in response to receiving the input from the user device.

5. The method according to claim 1, wherein the information data includes notes from a developer team member as to what codes need to be tested and what codes do not need to be tested before release of the application.

6. The method according to claim 1, further comprising:
   extracting a list of project tracking systems from the release branch.

7. The method according to claim 1, wherein the hook automatically integrates the project tracking systems as part of the deployment pipeline.

8. A system for implementing an application release management module, the system comprising:
   a receiver configured to receive a request for a user acceptance testing (UAT) deployment in a deployment pipeline in connection with an application being developed and to be released; and
   a processor operatively connected to the receiver via a communication network, wherein the processor is configured to:
   receive a release branch and a fix version as input in connection with the application;
   implement a hook with the release branch and the fix version as the input that automatically integrates project tracking systems as part of the deployment pipeline, wherein the hook is configured to automatically trigger the following processes:

receive the release branch as the input and connecting to a repository to fetch all project tracking system identifications (IDs) for a commit in connection with the application;

connect to corresponding project tracking systems to fetch detail information data for those project tracking systems based the IDs fetched from the repository; and validate for status of the project tracking systems based on scanning and analyzing the fetched detail information data prior to approving the received request for the UAT deployment, wherein in validating, the processor is further configured to:

validate the fix version associated with the application;

validate the commit, wherein the commit is an operation which sends latest changes to source code associated with the application to the repository; and validate dependent project tracking system status, child ticket status, and dependent ticket status associated with the application.

9. The system according to claim 8, wherein the processor is further configured to:

receive a positive validation result; and automatically approve the received request for the UAT deployment in the deployment pipeline.

10. The system according to claim 8, wherein the processor is further configured to:

receive a negative validation result;

automatically reject the received request for the UAT deployment in the deployment pipeline; and send an electronic notification to a user device utilized by a development team member to address the negative validation result and fix the version.

11. The system according to claim 10, wherein the processor is further configured to:

receive an input from the development team member via the user device after fixing the version; and automatically approve the received request for the UAT deployment in the deployment pipeline in response to receiving the input from the user device.

12. The system according to claim 8, wherein the information data includes notes from a developer team member as to what codes need to be tested and what codes do not need to be tested before release of the application.

13. The system according to claim 8, wherein the processor is further configured to:

extract a list of project tracking systems from the release branch.

14. The system according to claim 8, wherein the hook automatically integrates the project tracking systems as part of the deployment pipeline.

15. A non-transitory computer readable medium configured to store instructions for implementing an application release management module, wherein, when executed, the instructions cause a processor to perform the following:

receiving a request for a user acceptance testing (UAT) deployment in a deployment pipeline in connection with an application being developed and to be released;

receiving a release branch and a fix version as input in connection with the application;

implementing a hook with the release branch and the fix version as the input that automatically integrates project tracking systems as part of the deployment pipeline, wherein the hook is configured to automatically trigger the following processes:

receiving the release branch as the input and connecting to a repository to fetch all project tracking system identifications (IDs) for a commit in connection with the application;

connecting to corresponding project tracking systems to fetch detail information data for those project tracking systems based the IDs fetched from the repository; and validating for status of the project tracking systems based on scanning and analyzing the fetched detail information data prior to approving the received request for the UAT deployment, wherein validating further comprising:

validating the fix version associated with the application;

validating the commit, wherein the commit is an operation which sends latest changes to source code associated with the application to the repository; and validating dependent project tracking system status, child ticket status, and dependent ticket status associated with the application.

16. The non-transitory computer readable medium according to claim 15, wherein, when executed, the instructions further cause the processor to perform the following:

receiving a positive validation result; and automatically approving the received request for the UAT deployment in the deployment pipeline.

17. The non-transitory computer readable medium according to claim 15, wherein, when executed, the instructions further cause the processor to perform the following:

receiving a negative validation result;

automatically rejecting the received request for the UAT deployment in the deployment pipeline; and sending an electronic notification to a user device utilized by a development team member to address the negative validation result and fix the version.

18. The non-transitory computer readable medium according to claim 17, wherein, when executed, the instructions further cause the processor to perform the following:

receiving an input from the development team member via the user device after fixing the version; and automatically approving the received request for the UAT deployment in the deployment pipeline in response to receiving the input from the user device.

* * * * *